United States Patent Office 3,317,550
Patented May 2, 1967

3,317,550
DI-(BETA-HYDROXYALKYL)-DI-PYRIDYL-ALKANES
Francis E. Cislak, Charles K. McGill, and George W. Campbell, Jr., Indianapolis, Ind., assignors to Reilly Tar & Chemical Corporation, Indianapolis, Ind., a corporation of Indiana
No Drawing. Filed Apr. 26, 1965, Ser. No. 451,005
6 Claims. (Cl. 260—296)

This invention relates to new compositions of matter. More particularly, it relates to new organic compounds, di-(beta-hydroxyalkyl)-di-pyridyl alkanes, which compounds have the following general formula:

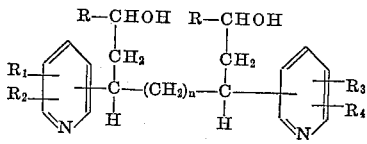

wherein $R_1$, $R_2$, $R_3$, and $R_4$ represent hydrogen or an alkyl group of from 1 to 4 carbon atoms, they may be alike or they may be different; $n$ is a small integer selected from 1 to 6; and R is hydrogen or methyl.

In general, our new compounds may be prepared by reacting an alkali metal amide, such as sodamide, lithium amide, potassium amide, with a dipyridyl alkane and then reacting the di-(alkali metal-picolyl)alkane with an ethylene oxide having the general formula

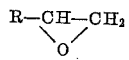

wherein R represents hydrogen or methyl.

The dipyridyl alkanes used in the practice of our invention are known compounds. In general, they may be prepared by reacting an alkylpyridine with sodamide and then with a dibromoalkane. Such a general procedure is described by Ames and Archibald in the Journal of the Chemical Society, 1962, page 1477.

The di-(beta-hydroxyalkyl)-di-(pyridyl)alkanes of our invention are di-functional alcohols. They have the chemical properties associated with alcohols and are capable of entering into the same type of reactions as other primary di-functional alcohols within the limitations imposed by the pyridine nucleus. They are water soluble and possess a very low volatility.

Our di-hydroxyalkyl-di-pyridylalkanes can be reacted, for example, with alkyl halides, to form pyridinium quaternaries. These pyridine quaternary type salts act as cationic detergents.

The di-hydroxyalkyl-di-pyridyl alkanes of our invention are useful in the manufacture of certain types of synthetic fibers. One of the newer and more acceptable synthetic fibers is a polyester of terephthalic acid and ethylene glycol. The dyeing properties of these polyester fibers are none too satisfactory. By the use of a small percentage (3% to 7%) of our di-hydroxyalkyl-di-pyridyl alkanes in the molecular make-up of the polyesters, the dyeing properties are greatly enhanced. The presence of the pyridine ring nitrogen in the resin molecule furnishes a point of attachment for acid dyes, thereby enabling them to be dyed in the usual manner. The degree of dye absorption depends upon the number of pyridine ring nitrogens present in the resin molecule.

The use of our di-hydroxyalkyl-di-pyridyl alkanes in the molecular make-up of the polyester resins used in making tire cords increases the bond between the fiber and the rubber. Such a fiber can be given the vinylpyridine latex treatment normally applied to nylon cord and then bonded to the rubber.

Also, the presence of the pyridine ring nitrogens in the molecular make-up of polyester resins containing our di-hydroxyalkyl-di-pyridyl alkanes increases the bond of these resins to the glass fibers commonly used for the reinforcement of fiber-glass-polyester compositions.

Our di-hydroxyalkyl-di-pyridyl alkanes are useful in inhibiting the action of non-oxidizing mineral acids upon steel. Thus, a 5% solution of our di-hydroxyalkyl-di-pyridyl alkanes dissolved in heavy coal-tar bases is effective as an inhibitor in the pickling of steel with sulfuric acid and in acidizing oil wells with hydrochloric acid.

Our invention will be described more fully in conjunction with the examples given below. It is to be understood, however, that these examples are by way of illustration only, and our invention is not to be limited by the details given therein.

EXAMPLE 1

1,3-di-(beta-hydroxyethyl)-1,3,-di-(4-pyridyl)propane

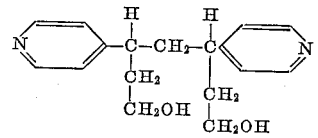

Seventy-eight grams of finely divided sodamide, prepared in any suitable manner, is dispersed in about 2,000 cc. of liquid ammonia. To this dispersion of sodamide in liquid ammonia is added 198 grams of 1,3-di-(4-pyridyl) propane; the latter compound is added in small portions, while stirring continually. After all the 1,3-di-(4-pyridyl)propane has been added, the reaction mixture is stirred for about one hour longer whereupon the sodio derivative of 1,3-di-(4-pyridyl)propane that was formed by the interaction of the sodamide and the 1,3-di-(4-pyridyl)propane, goes into solution. Then about 88 grams of ethylene oxide is added. The reaction mixture is stirred for about two to four hours after all of the ethylene oxide has been added. The 1,3-di-(beta-hydroxy-ethyl)-1,3,-di-(4-pyridyl)propane formed during the reaction period is isolated in any suitable manner.

One way of isolating the 1,3-di-(beta-hydroxy-ethyl)-1,3-di-(4-pyridyl)propane is as follows: The ammonia is evaporated. Water is added to hydrolyze any unreacted sodamine, and the sodium derivative of the 1,3-di-(beta-hydroxyethyl)-1,3-di-(4-pyridyl)propane. Then hydrochloric acid is added to neutralize the resulting sodium hydroxide, care being taken not to add an excess of the hydrochloric acid. The neutral solution is extracted several times with 500 cc. portions of 4-picoline. The 4-picoline extracts the 1,3-di-(beta-hydroxyethyl)-1,3-di-(4-pyridyl)propane from the aqueous solution. The 1,3-di-(beta-hydroxyethyl)-1,3-di-(4-pyridyl)propane is recovered from the 4-picoline solution by fractional distillation under high vacuum.

The 1,3-di-(beta-hydroxyethyl)-1,3-di-(4-pyridyl)propane boils at about 277° C. (1 mm.). It has a melting point of above about 150° C.

The reaction in liquid ammonia may be carried out at atmospheric pressure, or it may be conducted at superatmospheric pressure. Commercially we prefer to use superatmospheric pressure of the order of 100 to 200 lbs./sq. in. We prefer to carry out the reaction at relatively low temperatures of from about −30° C. to about 50° C.

While we prefer to use sodamide to form the disodio derivative of the 1,3-di-(4-pyridyl)propane, that is not necessary. We can, for example, use the N-sodium derivative of 2,6-dimethylpiperidine. All that is required is that we form an alkali metal derivative of the 1,3-di-(4-pyridyl)propane in a form suitable for reacting with the ethylene oxide.

In place of the ammonia, we may use other appropriate reaction media, such, for example, as dimethylaniline, tetrahydrofuran, and the like.

EXAMPLE 2

1,3-di-(beta-hydroxyethyl)-1-(3-pyridyl)-3-(4-pyridyl)propane

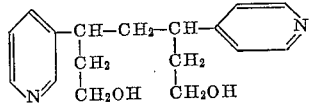

The procedure of Example 1 is repeated with the exception that 1-(3-pyridyl)-3-(4-pyridyl)propane is used in place of the 1,3-di-(4-pyridyl)propane.

EXAMPLE 3

1,3-di-(beta-hydroxyethyl)-1,3-di-(2-pyridyl)propane

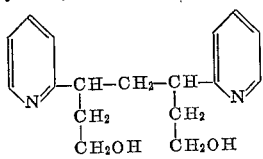

The procedure of Example 1 is repeated with the exception that 1,3-di-(2-pyridyl)propane is used in place of the 1,3-di-(4-pyridyl)propane.

EXAMPLE 4

1,3-di-(beta-hydroxyethyl)-1-(2-5-ethylpyridyl)-3-(4-pyridyl)propane

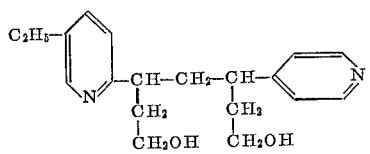

The procedure of Example 1 is repeated with the exception that 1-(2-5-ethylpyridyl)-3-(4-pyridyl)propane is used in place of the 1,3-di-(4-pyridyl)propane.

EXAMPLE 5

1,4-di-(beta-hydroxyethyl)-1,4-di-(4-pyridyl)butane

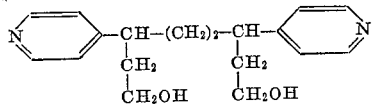

The procedure of Example 1 is repeated with the exception that 1,4-di-(4-pyridyl)butane is used in place of the 1,3-di-(4-pyridyl)propane.

EXAMPLE 6

1,3-di-(beta-hydroxypropyl)-1,3-di-(4-pyridyl)propane

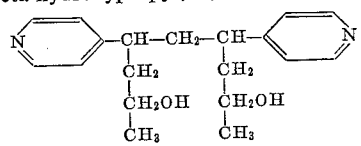

The procedure of Example 1 is repeated with the exception that 116 grams of propylene oxide is used in place of the 88 grams of ethylene oxide.

EXAMPLE 7

1,3-di-(beta-hydroxyethyl)-1-(2-pyridyl)-3-(4-pyridyl)propane

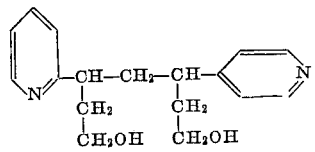

The procedure of Example 1 is repeated with the exception that 1-(2-pyridyl)-3-(4-pyridyl)propane is used in place of the 1,3-di-(4-pyridyl)propane.

EXAMPLE 8

1,8-di-(beta-hydroxyethyl)-1,8-di-(4-pyridyl)octane

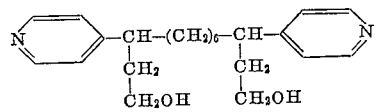

the procedure of Example 1 is repeated with the exception that 268 grams of 1,8-di-(4-pyridyl)octane is used in place of the 198 grams of 1,3-di-(4-pyridyl)propane.

EXAMPLE 9

1,3-di-(beta-hydroxyethyl)-1-(4,2,6-dimethylpyridyl)-3-(4-pyridyl)propane

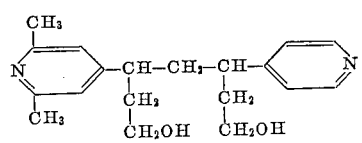

The procedure of Example 1 is repeated with the exception that 226 grams of 1-(4,2,6-dimethylpyridyl)-3-(4-pyridyl) propane is used in place of the 198 grams of 1,3-di-(4-pyridyl)propane.

We claim as our invention.

1. Di-(beta-hydroxyalkyl)-di-pyridyl alkane of the formula:

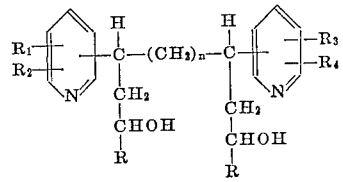

wherein $R_1$, $R_2$, $R_3$, and $R_4$ are selected from the class consisting of hydrogen and lower alkyl, R is a member of the group consisting of hydrogen and methyl, $n$ is a small integer of the group consisting of 1 to 6.

2. The compound 1,3-di(beta-hydroxyethyl)-1,3-di-(4-pyridyl)propane.

3. The compound 1,3-di-(beta-hydroxyethyl)-1,3-di-(2-pyridyl)propane.

4. The compound 1,3-di(beta-hydroxypropyl)-1,3-di-(4-pyridyl)propane.

5. The compound 1,3-di-(beta-hydroxyethyl)-1-(2-pyridyl)-3-(4-pyridyl)propane.

6. The compound 1,3-di-(beta-hydroxyethyl)-1-(2-5-ethylpyridyl)-3-(4-pyridyl)propane.

References Cited by the Examiner

Gilman et al., Some Reactions of Picolyllithium, Liede, Travaux Chimiques des Pays-Bas, 1950, vol. 69, page 431.

Norton et al., The Synthesis of Some Substituted 8-Aminoquinolines, J. Am. Chem. Soc., 1946, vol. 68, page 1572.

Saigo et al., Derivatives of Pyridylpropyl-Alcohols, Chemical Abstracts, 1955, vol. 49, column 9692.

Smith, L. I., Organic Synthesis, New York, Wiley and Sons, 1943, page 85.

WALTER A. MODANCE, *Primary Examiner.*

H. I. MOATZ, *Assistant Examiner.*